Feb. 10, 1970 G. J. PARISH 3,494,721
MONITORING OF A CLEANING PROCESS
Filed Feb. 8, 1966
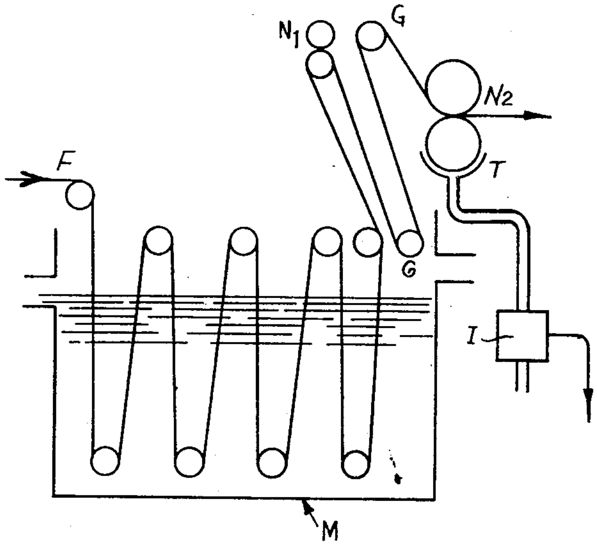
INVENTOR:
GEOFFREY J. PARISH
BY
Breitenfeld & Levine
ATTORNEYS United States Patent Office 3,494,721
Patented Feb. 10, 1970

3,494,721
MONITORING OF A CLEANING PROCESS

Geoffrey James Parish, Manchester, England, assignor to The Cotton Silk & Man Made Fibres Research Association, a corporation of Great Britain Filed Feb. 8, 1966, Ser. No. 525,945
Int. Cl. D06l *1/00*
U.S. Cl. 8—142 10 Claims

ABSTRACT OF THE DISCLOSURE

As material leaves cleaning apparatus, such as a washing machine, in which it is cleaned, the liquid retained by the material is removed in two stages, e.g., by two separate pairs of nip rollers. Most of the liquid removed in first stage. Liquid removed in second stage is collected, and its concentration of unwanted substances measured to give indication of concentration of such substances remaining in material. Signal dependent upon measurement may be used to adjust action of cleaning or other apparatus.

This invention concerns the monitoring of a continuous cleaning process of the kind (hereinafter termed of the kind referred to) wherein a travelling length of absorbent material particularly textile material is passed through a unit in which it is cleaned by treatment with a suitable liquid for the purpose of removing unwanted substances, hereinafter termed impurities whether such be dirt, or a chemical in the material from a previous treatment process.

In order satisfactorily to control a process of the kind referred to it is necessary to have some means for determining the concentration of impurity in the material after the cleaning treatment. The direct measurement of this concentration in a moving material is extremely difficult and measurements of concentration in solution are much simpler; many techniques for making this type of measurement are, of course, known and these techniques may apply either to continuously flowing solution or to discrete samples.

Methods for the monitoring of cleaning processes of the kind referred to are known which depend on measurements of the impurity concentration in the liquid in the cleaning tank. This type of measurement is unreliable for two reasons. Firstly, the concentration in the tank is generally lower than the concentration on the treated material and bears no fixed relation to it; the ratio of these concentrations depends on the efficiency of cleaning and on the amount of cleaning liquid employed. Secondly, the response of this type of measurement is generally slow, because of the large volume of liquid in the tank.

When the material emerges from the cleaning unit it is of course necessary substantially to remove the cleaning liquid retained by the material from such material and this is usually effected by passing the material through the nip of a mangle.

Measurement of the concentration of impurity in the liquid squeezed from the material at the nip does not suffer from the second disadvantage aforesaid, but experiments have shown that the concentration in this liquid shows the same type of variability in relation to the concentration in the treated material as does the liquid in the cleaning tank.

However, we have found that if a substantial proportion of the liquid is removed from the material before it reaches the nip the liquid then squeezed out at the nip has a concentration very close to that of the liquid retained by the material.

Thus, according to the present invention a method for monitoring a continuous cleaning process of the kind referred to includes the steps of removing the bulk of the liquid retained by the material after leaving the cleaning unit by any suitable means, removing further liquid by any suitable means collecting the liquid removed at said second means and measuring the concentration of impurity therein.

The step of measuring the concentration of impurity in the liquid expressed at said second means may be performed either at intervals or continuously.

According to a preferred feature of the invention a signal dependent upon the measurement is obtained which is either fed back to the cleaning unit for the purpose of adjusting conditions therein whereby the cleaning process is controlled automatically or fed to another machine for the purpose of compensating for an undesired characteristic found in said measurement.

The principles upon which the invention is based will be further apparent from the following tables which relate, by way of example only, to the removal of sodium chloride from a plain cotton cloth of 3.7 ounces per square yard.

In the experiments upon which the tables are based, samples of cloth were passed through a solution of sodium chloride for the purpose of impregnating same. Samples of impregnated cloth were washed with different severities. After washing, the cloth samples were led through two consecutive nips, the first to remove the bulk of the wash liquor from the material, the second to remove further liquor.

In the tables the impurity concentrations are given as grams of NaCl per litre of solution, and liquor retentions are expressed as percentages based on the overdry weight of the cloth.

Table I relates to cloth liquor and wash tank liquor, Table II cloth liquor and total nip liquor (that is the liquor from both nips) and Table III cloth liquor and second nip liquor after preliminary squeeze.

The results in Table I show that the impurity concentration of liquor retained by the cloth bears no constant relationship with that of the wash tank liquor.

The results in Table II show that the concentration of impurity in the liquor retained by the cloth bears no constant relationship with that of the total nip liquor.

The results in Table III show that the concentration of impurity in the liquor retained by the cloth bears a substantial constant relationship with that of the liquor removed at the second nip.

The results in Table II show levels of liquor removal at the nip which are unsatisfactory and Table II shows some levels of removal at the second nip that are satisfactory.

In our experiments with two nips, the nips have been so positioned that a time interval of about 3 to 6 seconds elapses between the two squeezings.

The liquor squeezed out at the main or second nip is collected in a tray beneath the nip rolls. To prevent the liquor from running back down the cloth and not reaching this tray the cloth must approach the nip from a higher level.

The results in the tables give impurity measurements as concentrations in the respective liquors. Some impurities are preferentially retained by the cloth (a good example is caustic soda on cellulose). In these circumstances the cloth, after squeezing, in addition to carrying contaminated liquor also holds some impurity more or less loosely bound to itself. The relation between the concentration in the nip liquor and the total impurity level on the cloth is then one of equilibrium, where equilibrium is the state that would be reached after prolonged contact between cloth and solution. The relative concentrations in this state can be determined beforehand by simple laboratory-scale tests.

TABLE I

[Impurity Concentration, g. NaCl per l. solution]

| In liquor in wash tank | In liquor retained by cloth |
|---|---|
| 0.12 | 1.24 |
| 0.24 | 1.76 |
| 0.48 | 1.98 |
| 0.80 | 2.20 |

TABLE II

| Impurity Concentration, g. NaCl per l. solution | | Liquor Content of Cloth, percent of dry cloth weight | | |
|---|---|---|---|---|
| In liquor removed at both nips | In liquor retained by cloth | Before nips | After nips | Removed at nips |
| 0.26 | 0.37 | 178 | 88 | 90 |
| 0.87 | 1.52 | 180 | 88 | 92 |
| 1.05 | 2.78 | 191 | 92 | 99 |
| 1.02 | 4.18 | 212 | 93 | 119 |

TABLE III

| Impurity Concentration, g. NaCl per l. solution | | Liquor Content of Cloth, percent of dry cloth weight | | |
|---|---|---|---|---|
| In liquor removed at second nip | In liquor retained by cloth | After first nip | After second nip | Removed at second nip |
| 0.26 | 0.28 | 110 | 103 | 7 |
| 0.47 | 0.47 | 111 | 102 | 9 |
| 1.03 | 1.12 | 109 | 92 | 17 |
| 1.34 | 1.29 | 103 | 89 | 14 |
| 1.80 | 1.83 | 108 | 89 | 19 |
| 2.53 | 2.73 | 110 | 91 | 19 |

It is thought that the techniques of monitoring a cleaning process of the kind referred to in accordance with the method of the invention could be usefully practised in many different fields, amongst which may be mentioned the washing of fabrics for removal of dirt, the scouring of fabrics after bleaching, desizing and removal of excess dye, for example.

The bulk of liquid may be removed from the material on leaving the cleaning unit by any suitable means, for example, by use of a nip, a suction means or a doctor-blade or like means.

Further liquid may be removed by a nip or any other suitable means collected for measurement of the impurity therein, and such measurement may be effected at intervals or continuously.

A suitable signal may be produced and fed either back to the cleaning unit to adjust the treatment conditions therein whereby the cleaning process is controlled automatically, or fed to another machine for the purpose of compensating for an undesired characteristic found in said measurement.

The accompanying drawing shows, by way of example only, in diagrammatic form, one form of apparatus for practising the invention in connection with a commercial washing process.

As can be seen a length of textile fabric F is passed through a conventional washing machine M in known manner. The fabric leaving the machine passes through a first nip $N_1$ comprised by a pair of bowls or rollers where the bulk of the liquor retained by the fabric is squeezed therefrom, collected and returned to the washing machine. The fabric is then passed through a second nip $N_2$ where further liquor is squeezed from same. This further liquor is collected by a trough T and passed through a measuring instrument I which gives a continuous electrical output signal whose magnitude is proportional to the concentration of impurity in the liquor sensed by the instrument I. This signal may be used either to control conditions in the washing machine M or to modify the conditions of a further processing of the fabric F as for example further washing machines in a washing range. It will be noted that the provision of guide rolls G between the two nips ensures a time interval between the two squeezings enabling conditions on the fabric to tend towards an equilibrium before the second squeezing.

What is claimed is:

1. A method of monitoring a continuous cleaning process of the kind wherein a travelling length of absorbent material is passed through a zone in which it is cleaned by treatment with a cleaning liquid for the purpose of removing unwanted substances therefrom, comprising the steps of removing the bulk of the liquid carried by the material after leaving the cleaning zone, thereafter removing residual liquid carried by the material, measuring the concentration of unwanted substances in said removed residual liquid, and producing a signal which is a function of the measured concentration of unwanted substances.

2. A method according to claim 1 wherein the step of measuring the concentration of unwanted substances in the liquid expressed at said second means is performed at intervals.

3. A method according to claim 1 wherein the step of measuring the concentration of unwanted substances in the liquid expressed at said second means is performed continuously.

4. A method according to claim 1 wherein each said means for removing liquid is comprised by a nip formed between two rotary cylindrical members.

5. A method according to claim 2 comprising the further step of using said signal for control purposes.

6. A method according to claim 3 comprising the further step of using said signal for control purposes.

7. A method according to claim 5 wherein said signal is fed back to control conditions in the cleaning zone whereby the cleaning process is controlled automatically.

8. A method according to claim 5 wherein said signal is used to control the action of a machine which processes said material subsequent to its passage through said cleaning zone for the purpose of compensating for an undesired characteristic found in said measurement.

9. A method according to claim 6 wherein said signal is fed back to control conditions in the cleaning zone whereby the cleaning process is controlled automatically.

10. A method according to claim 6 wherein said signal is used to control the action of a machine which processes said material subsequent to its passage through said cleaning zone for the purpose of compensating for an undesired characteristic found in said measurement.

References Cited

UNITED STATES PATENTS

| | | | |
|---|---|---|---|
| 2,223,860 | 12/1940 | Schellenberg | 8—137 XR |
| 3,101,239 | 8/1963 | Warren et al. | 8—142 |
| 3,101,240 | 8/1963 | Mathews | 8—142 |
| 3,160,317 | 12/1964 | Hambro | 8—142 XR |
| 3,093,442 | 6/1963 | Brown et al. | 8—142 |

MAYER WEINBLATT, Primary Examiner

U.C. Cl. X.R.

8—137, 147

UNITED STATES PATENT OFFICE
CERTIFICATE OF CORRECTION

Patent No. 3,494,721 Dated February 10, 1970

Inventor(s) GEOFFREY J. PARISH

It is certified that error appears in the above-identified patent and that said Letters Patent are hereby corrected as shown below:

Column 4, each of lines 26 and 30, delete "the liquid expressed at said second means" and replace with --said residual liquid--; line 33, delete "means" and "comprised" and replace with --steps-- and --performed--, respectively.

SIGNED AND SEALED
SEP 15 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
★ U.S. GOVERNMENT PRINTING OFFICE : 1969 O—366-334